(No Model.)
C. F. FARRAR & A. BOWMAN.
STOCK FOOD STEAMER AND EVAPORATOR.
No. 279,142. Patented June 12, 1883.
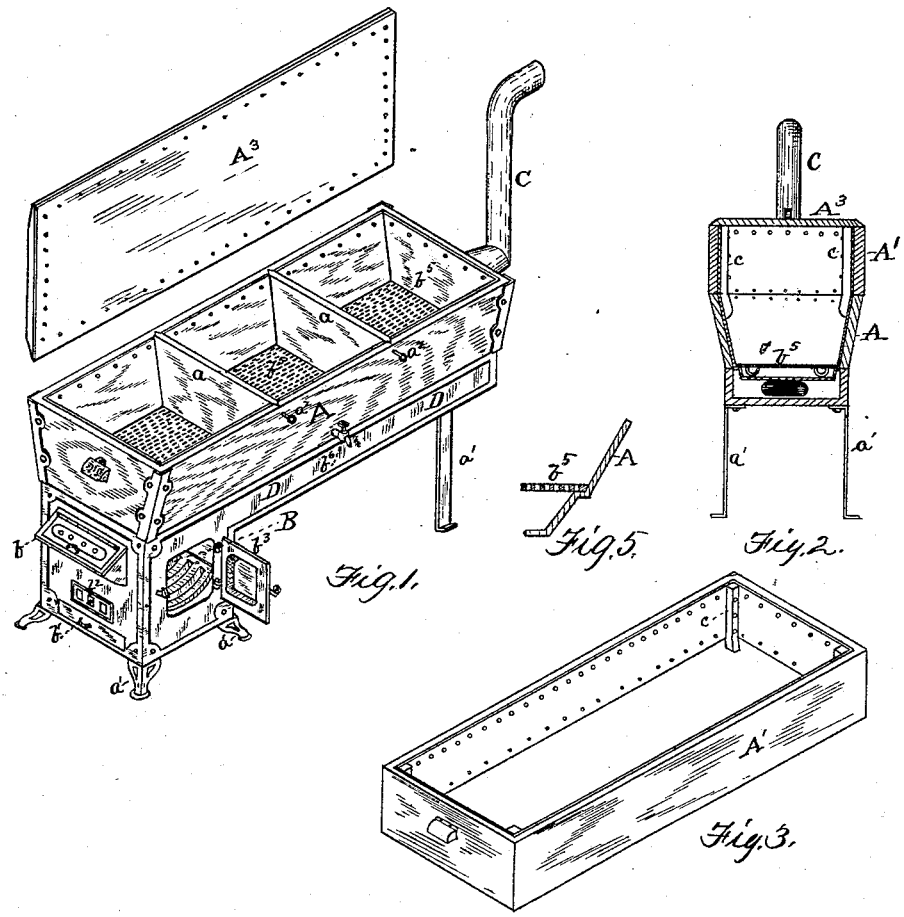
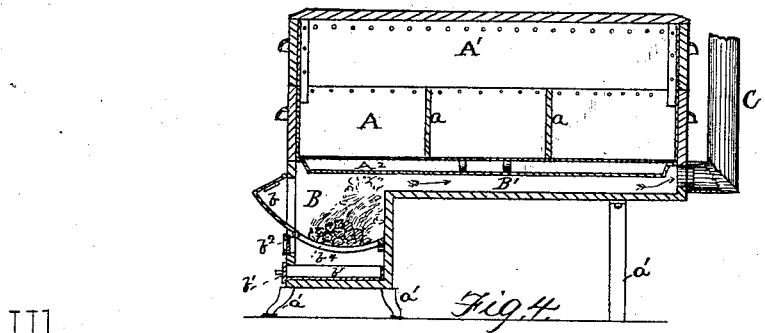
Witnesses
R. C. M. Trushall
John Harvey
Inventors
Charles F. Farrar
Alexander Bowman

UNITED STATES PATENT OFFICE.

CHARLES F. FARRAR, OF SOUTH LYON, AND ALEXANDER BOWMAN, OF MASON, MICHIGAN.

STOCK-FOOD STEAMER AND EVAPORATOR.

SPECIFICATION forming part of Letters Patent No. 279,142, dated June 12, 1883.

Application filed March 12, 1883. (No model.)

*To all whom it may concern:*

Be it known that we, CHARLES F. FARRAR, of South Lyon, in the county of Oakland and State of Michigan, and ALEXANDER BOWMAN, of Mason, in the county of Ingham and State of Michigan, have invented a new and useful Improvement in Stock-Food Steamers and Evaporators, which improvement is fully set forth in the following specification, reference being had to the accompanying drawings.

Similar letters of reference indicate corresponding parts.

Our invention relates to stock-food steamers and evaporators.

In the accompanying drawings, Figure 1 is a view in perspective. Fig. 2 is a cross-sectional view. Fig. 3 is a perspective view of the box A'. Fig. 4 is a longitudinal and vertical section, and Fig. 5 is a sectional view of the side of the tank A and false bottom $b^5$.

A represents the tank in which the food is cooked. This tank is made of wood, is constructed long and narrow, is lined with galvanized iron, and is made movable, so that it can be readily removed from its place over the heating-chamber. At the bottom of this tank we construct a metallic water-chamber, $A^2$, the whole length of the tank. For ordinary purposes we make the tank A so that it will hold about forty bushels of feed; but it often happens that for special occasions a much larger quantity is needed, and to prepare for such cases we have provided for enlarging the tank A by the addition of a box, A'. It is made of ordinary boards, and is made to fit closely on the edges of the tank A, and properly fastened thereto, so that it will not readily slide off. This is done by the standards $c\,c$, though other means may be devised for the same purpose. The lid $A^3$ of the tank A will also do for a covering for the extension-box A'.

In the construction of our furnace for cooking food for animals we provide partitions $a\,a$ in the cooking-tank A. These partitions, when in place, serve to divide the tank into two or more compartments, and the tank, as will readily be seen, is thus easily made from one into several cooking-chambers, so that while one kind of food is cooking in one chamber another kind may be cooking in another, and so on a third kind may be cooking in a third chamber. This division of the cooking-tank is of great utility when different kinds of stock are being fed by the same person, for generally in such cases they feed different kinds of food. As one kind of food will be easier cooked than another kind, the one done first can be easily removed and the others kept in till done. The great utility of the division of the tank A will readily be seen without further explanation. These partitions $a\,a$ are put in by means of the V-shaped groove in the side of the tank, and a corresponding V-shaped finish of the ends of the partitions $a$, and they will be held down in place by pins, as seen at $a^2$ in Fig. 1. $a'\,a'$ are legs of our furnace.

B is the combustion-chamber, and D D is the frame-work. Both are made of cast-iron. The chamber B is made nearly square, has a door, $b^3$, for charging in wood fuel, and has also the coaling-chute $b$. This latter has a damper to the lid, which is useful to regulate draft over the fuel, to admit more or less of air, or to shut it off altogether, as required. $b'$ is an ash-pan below the grate $b^4$. This grate $b^4$ is made of a circular shape, and we make it this shape so as to hold the burning coals in a close, compact manner, thus making a more perfect combustion, for air is thus admitted, not only from the bottom of the grate, but also from the sides thereof; and also by this shape of grate fire is kept from the walls of the furnace or chamber B, thus protecting them. The draft of the chamber B is along the smoke-flue B', the bottom of which flue B' is made of boiler-iron, is as broad as the combustion-chamber, and extends the full length of the tank A. In order to get the fullest benefit or service from the flame, we make this flue B' flat and wide, thus bringing the bottom of the water-tank $A^2$ nearer the bottom of the flue B'. In this way the heat is the most economically utilized. The smoke and waste heat pass off through the stack C in the direction of the arrow-points.

In order to keep the food while cooking separated from the water in the chamber $A^2$, we use the well-known device, a perforated false bottom, $b^5$, made of galvanized iron. This bottom $b^5$ is made to lie flat lengthwise and across the bottom of the tank A' and a little above the water-line. It has adequate supports in the center, resting on the bottom of the chamber $A^2$. The food while being cooked will lie on this bottom $b^5$, and the steam generated in the water-chamber $A^2$ is forced up through these perforations in the bottom $b^5$, and thus the cooking is accomplished.

It will readily be seen by reference to the the drawings that the water-chamber $A^2$ has a large heating-surface—for instance, in one of our tanks, seventy-eight inches long by thirty inches wide, we have a heating-surface of over sixteen square feet, and on all of this surface the heat has full force by reason of our flat and wide flue $B'$, thereby performing the work by the use of much less fuel than is required in those furnaces that have small heating-surfaces. By this large heating-surface in the flue $B'$ we cook the food better by cooking it quicker, for the steam can be more rapidly generated, and also raised to a greater degree of heat on the same quantity of fuel. Although we do thus get up a higher degree of heat, there will be no danger of scorching the food, as the water-chamber $A^2$ intervenes, and also the bottom $b^5$. The water-chamber $A^2$ has a capacity for holding from twenty-five to thirty gallons of water, and this will outlast the fuel necessary to cook the food, so that there is no danger from lack of water over the fire.

The tank A can be utilized for other purposes than simply the cooking of animal food—as, for instance, in evaporating sugar-water or sorghum, making soap, boiling clothes, scalding hogs, washing sheep, &c.

Through the faucet $b^6$ boiling water may be run off for special uses while the cooking is going on, for draining the water from the chamber $A^2$, &c.

The rest for the bottom $b^5$ in the bottom of the tank A and over the water-chamber $A^2$ is seen in Fig. 5, A being the side of the tank.

In operating our furnace a fire is kindled in the chamber B, water is put into the chamber $A^2$, and when the articles to be cooked are in their respective compartments the lid $A^3$ is placed on, so as to confine the steam within the tank A. When a larger bulk of food is to be cooked than the tank A will hold we put on the extra box $A'$ and place the lid $A^3$ on top, as in the case before mentioned.

Having thus described our invention, what we claim, and desire to secure by Letters Patent, is—

1. In an animal-food steamer, a food-tank provided with removable partitions, an extension, and a top, in combination with a water-tank situated beneath said feed-tank, a perforated removable bottom between said tanks, and means for heating said water-tank, substantially as and for the purposes described.

2. The combination, in a stock-food steamer and evaporator, of the combustion-chamber B, having the circular grate $b^4$, coaling-chute $b$, damper $b^2$, ash-pan $b'$, flue $B'$, tank A, perforated bottom $b^5$, and water-chamber $A^2$, substantially as described, shown, and for the purpose set forth.

In testimony whereof we hereto set our hands.

CHARLES F. FARRAR.
ALEXANDER BOWMAN.

Witnesses:
CLARENCE BURLEIGH,
J. B. GRIMES.